US010954868B2

(12) United States Patent
Alt et al.

(10) Patent No.: US 10,954,868 B2
(45) Date of Patent: Mar. 23, 2021

(54) METHOD AND DEVICE FOR CONTROLLING A CAMSHAFT PHASE ADJUSTER IN AN INTERNAL COMBUSTION ENGINE

(71) Applicant: Robert Bosch GmbH, Stuttgart (DE)

(72) Inventors: Benedikt Alt, Rutesheim (DE); Konrad Moser, Ludwigsburg (DE); Patrick Grau, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/693,474

(22) Filed: Nov. 25, 2019

(65) Prior Publication Data
US 2020/0173377 A1    Jun. 4, 2020

(30) Foreign Application Priority Data
Nov. 30, 2018    (DE) .......................... 102018220743.7

(51) Int. Cl.
*F02D 13/02* (2006.01)
*F02D 41/00* (2006.01)
*F01L 1/34* (2006.01)

(52) U.S. Cl.
CPC ............ *F02D 13/0219* (2013.01); *F01L 1/34* (2013.01); *F02D 41/009* (2013.01)

(58) Field of Classification Search
CPC .. F02D 13/02; F02D 13/0215; F02D 13/0219; F02D 13/0261; F02D 41/00; F02D 41/009; F02D 41/062; F02D 41/26; F01L 1/04; F01L 1/047; F01L 1/34; F01L 1/344; F03C 1/0463; F03C 1/0466
See application file for complete search history.

(56) References Cited

U.S. PATENT DOCUMENTS

| | | | |
|---|---|---|---|
| 2003/0005900 A1* | 1/2003 | Katayama | F01L 1/26 123/90.17 |
| 2003/0005901 A1* | 1/2003 | Katayama | F01L 1/34 123/90.17 |
| 2005/0061272 A1* | 3/2005 | Mezger | F02D 13/0215 123/90.15 |

(Continued)

*Primary Examiner* — John Kwon
*Assistant Examiner* — Johnny H Hoang
(74) *Attorney, Agent, or Firm* — Norton Rose Fulbright US LLP; Gerard Messina

(57) ABSTRACT

A method for operating an internal combustion engine having a camshaft phase adjuster, including: providing a nonlinear final control element model, which indicates via a functional relationship an angular velocity of a relative adjustment of the camshaft phase adjuster as a function of an actuator correcting variable for the control of the camshaft phase adjuster; carrying out a control based on a deviation between a predefined camshaft angle adjustment setpoint value, and a camshaft angle adjustment actual value, to obtain as a control output a setpoint positioning rate of the camshaft phase adjuster; calculating the actuator correcting variable as a function of the setpoint positioning rate using an inverted final control element model; applying a predefined correction variable to the actuator correcting variable; controlling the camshaft phase adjuster using the actuator correcting variable to which the correction variable has been applied, to operate the internal combustion engine.

15 Claims, 4 Drawing Sheets

(56) References Cited

U.S. PATENT DOCUMENTS

| | | | |
|---|---|---|---|
| 2010/0186700 A1* | 7/2010 | Kandolf | F01L 1/3442 |
| | | | 123/90.17 |
| 2010/0242880 A1* | 9/2010 | Watanabe | F02D 13/0219 |
| | | | 123/90.17 |
| 2013/0055980 A1* | 3/2013 | Yokoyama | F02D 41/30 |
| | | | 123/90.17 |
| 2014/0076251 A1* | 3/2014 | Matsuo | F02D 13/0261 |
| | | | 123/90.15 |
| 2017/0114728 A1* | 4/2017 | Kosaka | F01L 1/344 |
| 2017/0248084 A1* | 8/2017 | Jung | F01L 1/047 |

* cited by examiner

METHOD AND DEVICE FOR CONTROLLING A CAMSHAFT PHASE ADJUSTER IN AN INTERNAL COMBUSTION ENGINE

CROSS REFERENCE

The present application claims the benefit under 35 U.S.C. § 119 of German Patent Application No. DE 102018220743.7 filed on Nov. 30, 2018, which is expressly incorporated herein by reference in its entirety.

FIELD

The present invention relates to internal combustion engines and more specifically, to internal combustion engines in which an operation of the intake and exhaust valves is carried out with the aid of a camshaft. In addition, the present invention relates to internal combustion engines having camshaft phase adjusters by which the phase positions of the opening duration of the intake and exhaust valves are able to be adjusted.

BACKGROUND INFORMATION

In reciprocating-piston combustion engines, the valve operation of the intake and exhaust valves is normally mechanically controlled with the aid of an intake camshaft and/or an exhaust camshaft. Cams of the respective camshaft act on tappets of the intake valves or exhaust valves and specify the phases in which the intake and exhaust valves are opened, synchronously with a rotation of a crankshaft of the internal combustion engine.

In order to obtain a further degree of freedom in the operation of the internal combustion engine, a camshaft may be provided with a camshaft phase adjuster, which varies the relative relationship of the camshaft to the phase position of the crankshaft. This makes it possible to fundamentally change the engine characteristics because the opening and closing instants of the controlled intake or exhaust valves define the cylinder charge and/or the residual gas rate as well as flow processes in the internal combustion engine, and thus the torque characteristic over the rotational speed, to a significant extent.

The camshaft phase adjuster may be provided as a hydraulic final control element, for example, which is able to rotate the camshaft relative to the crankshaft. The hydraulic phase adjuster is designed in such a way that it adjusts itself when a corresponding controlling torque is generated in the phase adjuster. This controlling torque depends directly on an oil pressure difference in hydraulic chambers working against one another. The oil pressure difference is able to be influenced via an electromagnetic valve during an operation of the internal combustion engine by specifying a correcting variable.

The electromagnetic valve is controllable by supplying an electric power which is able to be effectively adjusted by specifying the correcting variable indicating a pulse duty factor. To adjust the pulse duty factor, and thus to control the adjustment degree of the camshaft phase adjuster, a position control is provided which is usually implemented as a PID controller.

Because of the production spread in the manufacture and aging effects during the vehicle operation, considerable deviations in the controlled system and, as a consequence, in the control quality may occur, which may lead to overshooting, stationary control deviations and the like. These deviations in the control quality of the position control for the camshaft phase adjuster have a considerable effect on the engine characteristic in terms of performance and emission behavior.

In addition, a portion of the stationary holding pulse duty factor is calculated from the integral portion of the position control, which is taken into account together with an applied holding pulse duty factor. This makes it possible to compensate for quasi-stationary disturbances such as changes over time in a spring moment or a moment of friction, the occurrence of leakages or interference moments from external consumers and the like.

To compensate for the controller response, it was necessary until now to adapt the controller parameters in a usually complex manner to the respective production spread and for the different working points of the respective type of internal combustion engine, in order to thereby ensure a uniform control quality for each individual internal combustion engine across the entire operating range of the internal combustion engine.

SUMMARY

According to the present invention, a method for operating an internal combustion engine including a camshaft phase adjuster, a device for operating a camshaft phase adjuster, as well as an engine system are provided.

Example embodiments of the present invention are described herein.

According to a first aspect of the present invention, an example method for operating an internal combustion engine including a camshaft phase adjuster is provided, the method including the following steps:

Providing a nonlinear final control element model, which indicates via a functional relationship an angular velocity of a relative adjustment of the camshaft phase adjuster as a function of an actuator correcting variable for the control of the camshaft phase adjuster;

Carrying out a position control based on a deviation between a predefined camshaft angle adjustment setpoint value, which indicates a setpoint value of the relative displacement between the crankshaft position angle and the camshaft position angle, and a camshaft angle adjustment actual value, which indicates an actual relative displacement, in order to obtain as a control output a setpoint positioning rate of the camshaft phase adjuster;

Calculating an actuator correcting variable as a function of the setpoint positioning rate with the aid of an inverted final control element model;

Applying a predefined correction variable to the actuator correcting variable;

Controlling the camshaft phase adjuster using the actuator correcting variable to which the correction variable has been applied, in order to operate the internal combustion engine.

The above method provides an improved position control of a variably adjustable camshaft with the aid of a camshaft phase adjuster. For this purpose, the control is provided in the form of a model-based control, which considers both the nonlinear system response, i.e., a nonlinear relationship between a control correcting variable and an angular velocity of the final control element of the camshaft phase adjuster, and the dynamic linear response, i.e., the effect of a time delay for building up the corresponding positioning rate. The nonlinear system response, for instance, is able to be ascertained under nominal conditions based on predefined movement profiles, either manually or in an automated manner, and be suitably inverted in order to provide a characteristic curve for ascertaining the control correcting variable as a function of positioning rate specifications. Because it is possible to adapt the inverted final control element model with the aid of a correction variable, influences by the temperature of the hydraulic oil, the hydraulic pressure, the engine speed and other parameters are jointly able to be taken into account without having to adapt the control parameters of the position control. This makes it possible to considerably improve the control quality and the application outlay.

Advantages of the above method are that a model-based position control is provided for a camshaft phase adjuster, which considers a nonlinear system characteristic curve and which is able to be adapted in a particularly uncomplicated manner. This allows for a quantitative description of the nonlinear system response so that the position control is able to compensate for the nonlinearities. A complex and possibly redundant consideration of the nonlinearities of the system based on control parameters as a function of operating points may thus be dispensed with. This simplifies the application process and reduces the complexity of the corresponding software function in the control unit.

In addition, the inverted final control element model may also be repeatedly adapted during an ongoing vehicle operation and also across the service life so that aging effects and wear effects may be compensated for as well.

Moreover, a stationary pilot control may be provided, which adds a pilot control variable to the setpoint positioning rate in order to obtain a modified setpoint positioning rate on the basis of which the actuator correcting variable is calculated with the aid of the inverted final control element model. Because the control function is split up into a nonlinear component and a dynamic linear component, the application of the control components is able to take place independently of each other. Only the inverted final control element model that is appropriately adapted, i.e., usually by one or a few parameter(s), has to be stored for this purpose. The individual calibration of the camshaft position control may particularly be accomplished by simply adapting the nonlinear final control element model, whereas the control parameters may be retained without change. This possibility considerably reduces the application expense.

It may furthermore be provided that a disturbance variable monitor is used, which adds to the setpoint positioning rate a monitor component of the setpoint positioning rate for the compensation of disturbances at the input of the controlled system so as to obtain a modified setpoint positioning rate by which the actuator correcting variable is calculated with the aid of the inverted final control element model.

According to one specific embodiment of the present invention, the actuator correcting variable is able to be multiplied by the correction variable.

In addition, the correction variable may be determined in that
the modeled positioning rate is determined from the setpoint positioning rate of the controller with the aid of the final control element model, the final control element model having a model parameter which corresponds to the correction variable;
a difference is ascertained between the current actual positioning rate and the modeled positioning rate; and
the correction variable is determined by minimizing the resulting deviation of the positioning rate.

According to a further aspect of the present invention, an example device for operating a camshaft phase adjuster for an operation of an internal combustion engine is provided, the device being developed
to carry out a control based on a deviation between a predefined camshaft angle adjustment setpoint value, which indicates a setpoint value of the relative displacement between the crankshaft position angle and the camshaft position angle, and a camshaft angle adjustment actual value, which indicates an actual relative displacement, in order to obtain as a control output a setpoint positioning rate of the camshaft phase adjuster;
to calculate an actuator correcting variable as a function of the setpoint positioning rate with the aid of an inverted final control element model, the final control element model indicating via a functional relationship an angular velocity of a relative adjustment of the camshaft phase adjuster as a function of the actuator correcting variable, for the control of the camshaft phase adjuster;
to apply a predefined correction variable to the actuator correcting variable;
to control the camshaft phase adjuster using the actuator correcting variable to which the correction variable has been applied, in order to operate the internal combustion engine.

According to a further aspect, an example engine system including an internal combustion engine is provided, which is developed in the form of a reciprocating-piston internal combustion engine, the internal combustion engine having at least one camshaft, driven by the crankshaft, for operating an intake and/or exhaust valve of a cylinder of the internal combustion engine, the camshaft being coupled with a camshaft phase adjuster for a relative adjustment between the crankshaft and the camshaft, and including the above device.

BRIEF DESCRIPTION OF THE DRAWINGS

Specific embodiments are described in greater detail in the following text with the aid of the figures.

DETAILED DESCRIPTION OF EXAMPLE EMBODIMENTS

Figure 1:
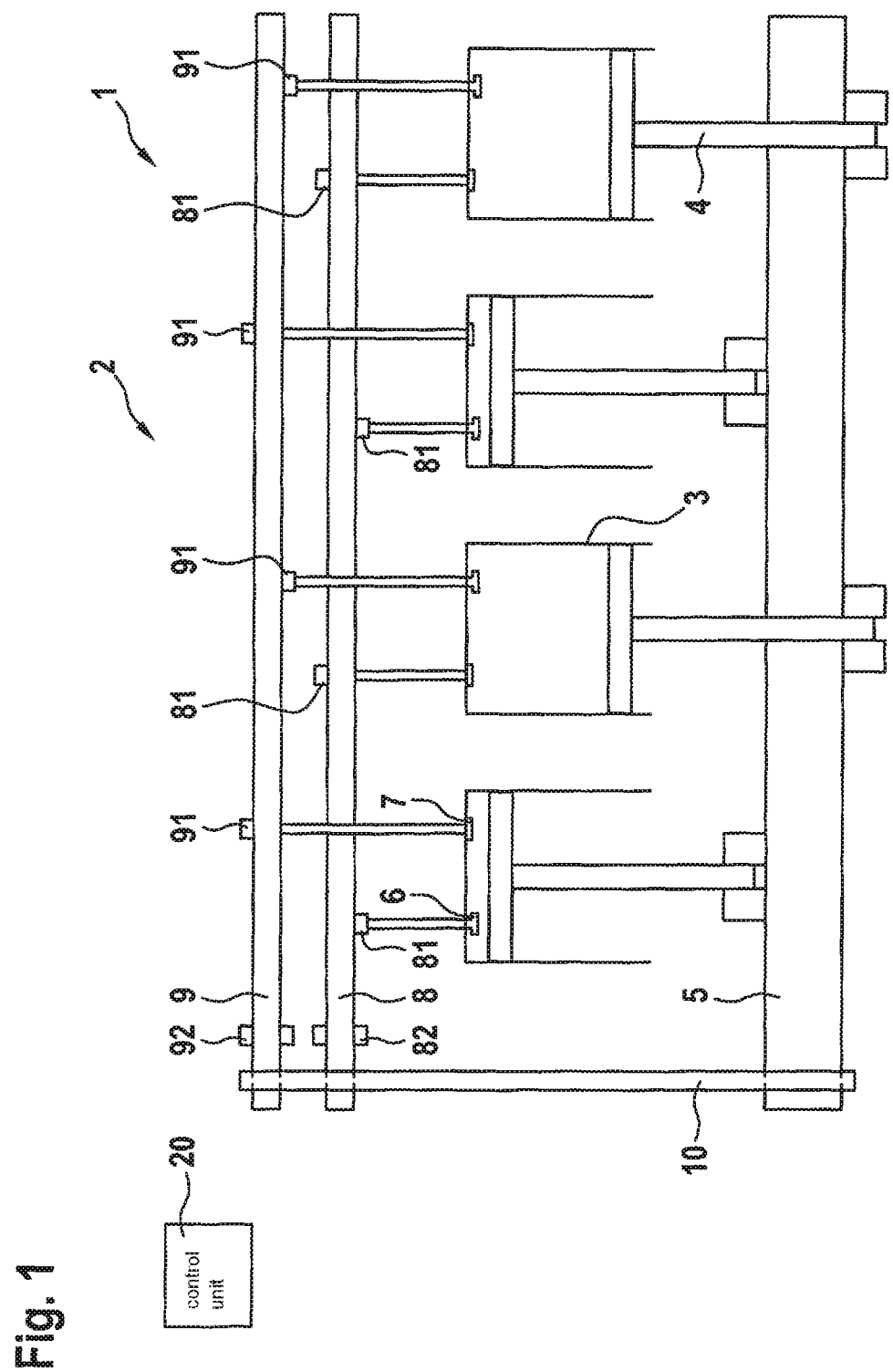
FIG. 1 shows a schematic illustration of an engine system including an internal combustion engine.

FIG. 1 shows a schematic illustration of an engine system 1 having an internal combustion engine 2, which may be developed in the form of a reciprocating-piston internal combustion engine. Internal combustion engine 2 may correspond to an air-directed (spark-ignition engine) or a fuel-directed combustion engine (Diesel engine). Internal combustion engine 2 has two pistons 3, which are able to execute a translatory movement within combustion chambers of cylinders 3 and are coupled via piston rods 4 to a crankshaft 5 in a conventional manner.

Cylinders 3 of internal combustion engine 2 are operated according to a four-stroke operation, and air is introduced into cylinders 3 in a cyclical manner via intake valves 6, and combustion exhaust gas is expelled from cylinders 3 via exhaust valves 7. The valve operations of intake and exhaust valves 6, 7 are controlled via respective camshafts, i.e. an intake camshaft 8 and an exhaust camshaft 9. Camshafts 8, 9 are mechanically connected to crankshaft 5 via a cogged belt 10, for instance, or in some other way, in a phase-locked manner.

Camshafts 8, 9 have cams 81, 91 for each cylinder 3, which operate intake valves 6 and exhaust valves 7 in order to thereby control them for the opening and closing. One of camshafts 8, 9 or both camshafts 8, 9 may be provided with a camshaft phase adjuster 82, 92, which makes it possible to adjust the position of cams 81, 91 relative to the position of crankshaft 5 of the crankshaft angle.

Since camshafts 8, 9 are driven by crankshaft 5 via a cogged belt 10, the control times are indicated as an angle of rotation in each case, which is related to the position, i.e., the angular position, of crankshaft 5.

Internal combustion engine 2 is operated via a control unit 20, which particularly also assumes the control of camshaft phase adjusters 82, 92.

Figure 2:
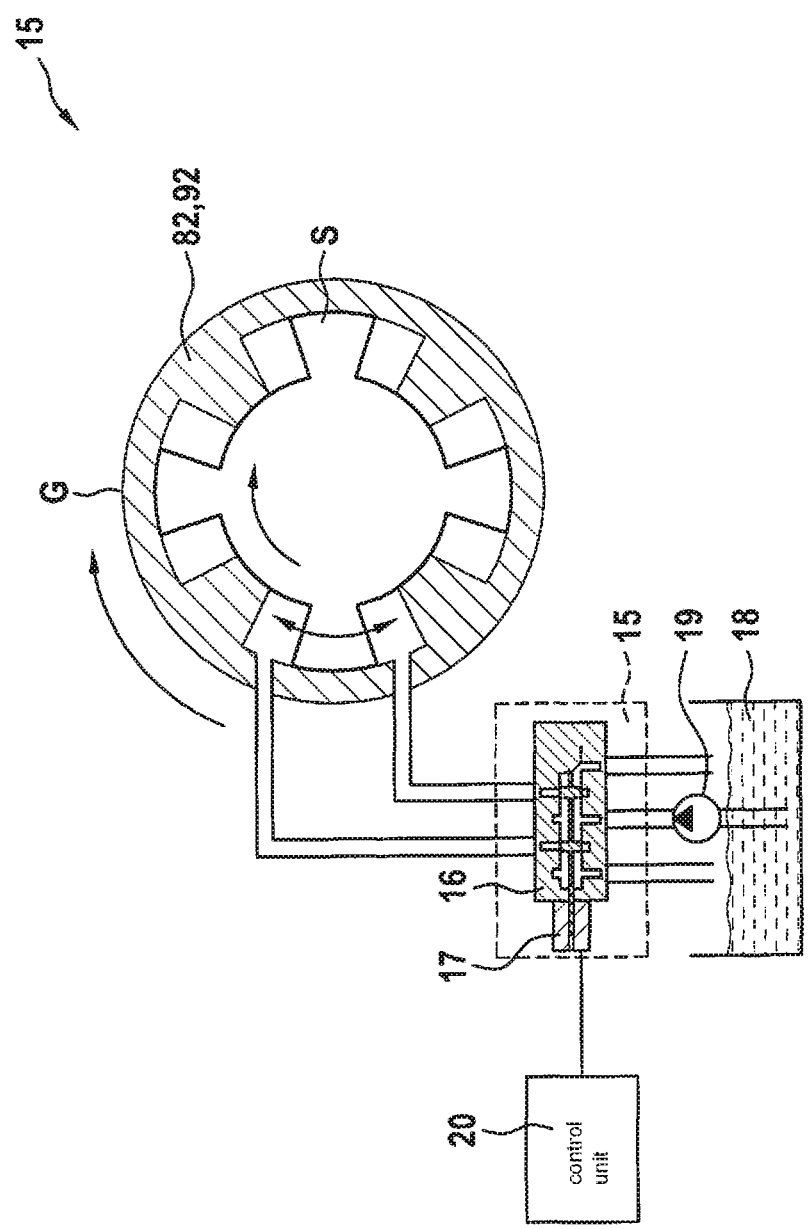
FIG. 2 shows a system having a hydraulic camshaft phase adjuster, which is able to be controlled via an electromechanical valve.

FIG. 2 schematically shows a hydraulic camshaft phase adjuster 82, 92 and a control unit 15 intended for it. Camshaft phase adjuster 82, 92 has a housing G and a final control element S, which are rotationally adjustable relative to each other. Housing G and final control element S have teeth that point toward each other in order to define hydraulic chambers. Hydraulic chambers situated opposite in relation to a tooth of final control element S act against each other so that final control element S is retained in its position when equal pressures are present in the hydraulic chambers and the final control element is moved in the direction of the chamber having the lower pressure when unequal pressures are present in the hydraulic chambers. When final control element S is spring-loaded, a certain pressure differential between the hydraulic chambers is required in order to retain final control element S. Any deviation from this pressure differential leads to a positioning movement of camshaft phase adjuster 82, 92. The hydraulic chambers are connected to a pump which supplies the required hydraulic pressure.

Control unit 15 has an electromechanical control valve 16, which is controllable by a positioning actuator 17 based on an actuator correcting variable x in order to provide a certain valve setting. The valve setting causes oil to be applied to the hydraulic chambers at a pressure that is predefined by the valve setting. For this purpose, hydraulic oil is supplied from a hydraulic accumulator 18 and an oil pressure pump 19. This is an integral controlled system in which the camshaft position angle is adjusted by an adjustment of final control element S until a mechanical stop is reached or until this movement is counteracted by an opposite pulse duty factor or a corresponding load.

The relationship between the angular velocity $\dot{\varphi}$ of camshaft phase adjuster 82, 92 and actuator correcting variable x is nonlinear and is described via a corresponding nonlinear final control element model that indicates this functional relationship. In particular, the transformation ratio between actuator correcting variable x and resulting positioning rate $\dot{\varphi}$ may vary as a result of constructive measures. The characteristic curve of the final control element model thus describes the resulting positioning rate as a function of the used actuator correcting variable x. The characteristic curve of the final control element model in particular makes it possible to describe the varying transformation ratio via the nonlinear relationship. It was found that aging and wear effects as well as component tolerances predominantly manifest themselves in scaling of the final control element characteristic curve.

If the holding pulse duty factor $U_{fwd,steady}$ is not seen as part of the final control element characteristic curve, then it, too, (or the correction value from the disturbance variable monitor, which is not described here) has a considerable dependence on these influences. This is an additional degree of freedom for the application. During the initial operation, it may perhaps not be possible to express all influences in velocity coordinates.

Figure 3:
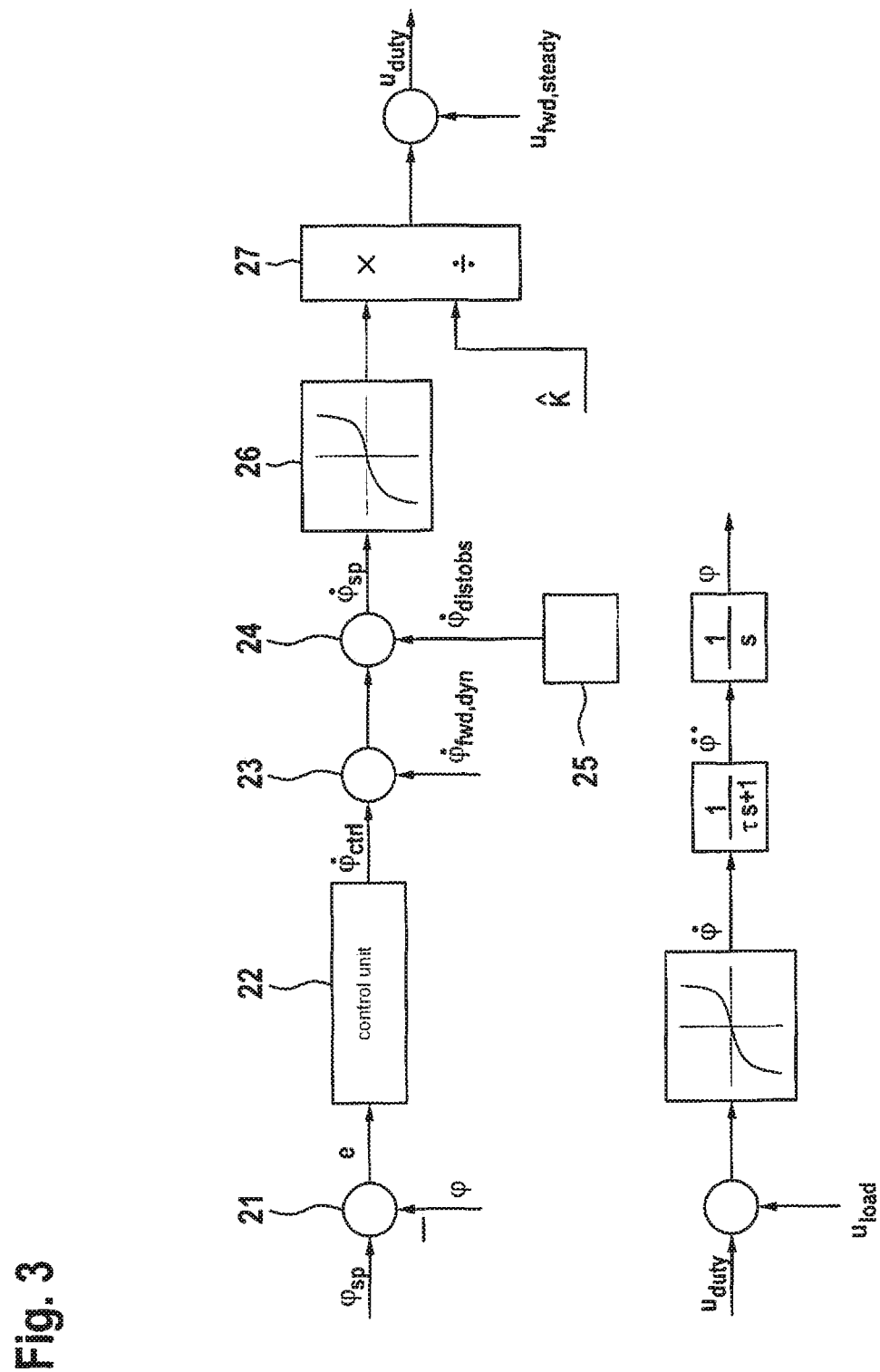
FIG. 3 shows a schematic illustration of a controller structure for a camshaft position control of the system from FIG. 2.

In FIG. 3, the structure of the camshaft position control, which is carried out in control unit 20, is schematically illustrated. Toward this end, a camshaft angle adjustment setpoint value $\varphi_{sp}$, which is specified by an engine control algorithm and indicates a setpoint value of the relative displacement between the crankshaft position angle and the camshaft position angle, and a camshaft angle adjustment actual value $\varphi_{actual}$, which indicates an actual relative displacement and which is able to be measured by a position sensor, is forwarded to a difference block 21 so that a position deviation may be ascertained as a control difference e.

Control difference e is forwarded to a control unit 22, which is preferably developed as a PD controller. The PD controller is developed so that the control output as the correctional variable corresponds to a setpoint value $\dot{\varphi}_{ctrl}$ for a positioning rate (setpoint positioning rate) of camshaft phase adjuster 82, 92.

In order to reduce the loading of the control during a transient operation, a dynamic pilot control, for example, is able to be used, which adds a predefined dynamic pilot control variable $\dot{\varphi}_{fwd,dyn}$ to the setpoint positioning rate $\dot{\varphi}_{ctrl}$ from the control in a first summation block 23. Dynamic pilot control variable $\dot{\varphi}_{fwd,dyn}$ may be developed to estimate on the basis of the mathematical position encoder model the required characteristic of a pilot control rate from the time characteristic of the predefined camshaft angle adjustment setpoint value $\varphi_{sp}$. Camshaft angle adjustment setpoint value $\varphi_{sp}$ is used as output information for a trajectory calculated in reverse by the position encoder model, which is then to be realized by the pilot control. The trajectory may also correspond to the characteristic of camshaft angle adjustment setpoint value $\varphi_{sp}$. This trajectory may also include time filtering of camshaft angle adjustment setpoint value $\varphi_{sp}$.

In addition, it is alternatively or additionally possible to use a disturbance variable monitor 25, which adds a predefined monitor component $\dot{\varphi}_{distobs}$ of the setpoint positioning rate from control unit 22 to setpoint positioning rate $\dot{\varphi}_{ctrl}$ in a second summation block 24. Disturbance variable monitor 25 may include a model block for calculating an inverse position encoder model and a filter. Disturbance variable monitor 25 is used to compensate for position deviations that may occur due to an input disturbance in the position encoder system, and in particular, also to compensate for unknown disturbances at the input of the controlled system. If there is a change in position on account of a disturbance, e.g., a spring torque of a restoring spring, a moment of friction, leakage of the hydraulic system or disturbance moments of external consumers, then disturbance variable monitor 25 is able to compensate for the disturbance. Disturbance variable monitor 25 is able to calculate the disturbance from the instantaneous correcting variable and actual position φ.

From the result of the application of pilot control variable $\dot{\varphi}_{fwd,dyn}$ and monitor component $\dot{\varphi}_{distobs}$ to setpoint positioning rate $\dot{\varphi}_{ctrl}$ a modified setpoint positioning rate $\dot{\varphi}_{sp}$ is obtained, which is supplied to a characteristic curve block 26 as an input variable for a predefined inverted final control element model. Because of the inverted final control element model, modified setpoint positioning rate $\dot{\varphi}_{sp}$ is allocated to a preliminary actuator controlled variable x, which may be developed as a pulse duty ratio for a pulse-width modulated control of positioning actuator 17 or the like, for instance.

To adapt this control, a correction variable K is able to be applied to the preliminary actuator correcting variable $x_{raw}$ ascertained in this way, in particular in a division block 27 as a quotient.

In addition, a holding correcting variable $x_{steady}$ may be added to corrected actuator correcting variable $x_{corr}$ in a summing block 28 in order to obtain actuator correcting variable x for the control of positioning actuator 17.

The actuator characteristic curve is able to be ascertained on a test stand, in particular in a manner known per se, in the process of which predefined actuator correcting variables are applied to camshaft phase adjuster 82, 92 in order to be able to detect a corresponding positioning rate.

Figure 4:
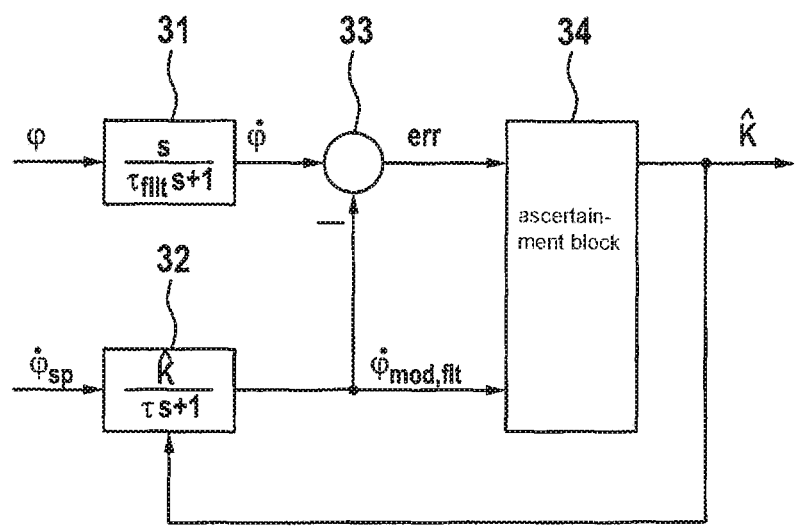
FIG. 4 shows a schematic illustration of an adaptation of the correction variable for adapting a camshaft position control.

FIG. 4 schematically illustrates a function model for providing correction variable K; camshaft angle adjustment actual value $\varphi_{actual}$ of the final control element of camshaft phase adjuster 82, 92 is derived in terms of time according to a high-pass filter 31 in order to obtain an instantaneous actual positioning rate $\dot{\varphi}_{actual}$. In addition, model positioning rate $\dot{\varphi}_{mod,flt}$ is determined from setpoint positioning rate $\dot{\varphi}_{sp}$ via the non-inverted final control element model. The non-inverted final control element model has a model parameter that corresponds to correction variable K.

In a difference block 33, a difference is ascertained between the instantaneous actual positioning rate $\dot{\varphi}_{actual}$ and modeled positioning rate $\dot{\varphi}_{mod,flt}$.

The resulting deviation err (positioning rate difference) of the positioning rate (positioning rate difference) is forwarded to an ascertainment block 34 in which correction variable K is optimized, for instance with the aid of a gradient descent method.

Figure 5:
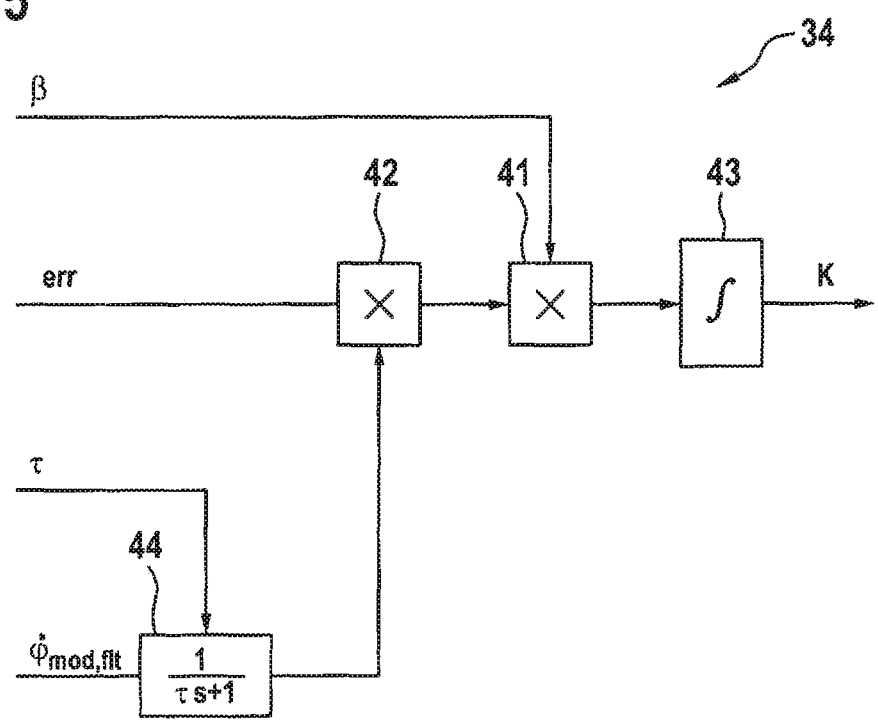
FIG. 5 shows a schematic illustration of the ascertainment of the correction variable based on the modeled positioning rate.

FIG. 5 schematically illustrates ascertainment block 34 in greater detail. Resulting positioning rate difference err is multiplied by a scaling factor ß in a first multiplication block 41. Scaling factor ß specifies the measure of a convergence rate.

Moreover, modeled positioning rate $\dot{\varphi}_{mod,flt}$ is partially derived in a derivation block 44 at a predefined time constant τ and also multiplied by positioning rate difference err in a second multiplication block 42.

The result is integrated in an integrator block 43 in order to obtain correction variable K.

On the whole, correction variable K is calculated in that positioning rate difference err from instantaneous actual positioning rate $\dot{\varphi}_{actual}$ and modeled positioning rate $\dot{\varphi}_{mod,flt}$ is multiplied by a constant and/or variable scaling factor ß and subsequently integrated.

The above approach allows for a particularly reliable control of a camshaft phase adjuster 82, 92, which is easily adaptable, in particular. By separating the nonlinear response of the control system into the final control element model and the recognition that aging and wear tolerances are able to be represented in the final control element model via a multiplicative correction factor K, the above control system may be used in a particularly flexible manner for different camshaft phase adjusters 82, 92. In addition, because of the automatic adjustment of correction variable K through an optimization method, an automatic adaptation to the conditions of the control system is able to take place.

What is claimed is:

1. A method for operating an internal combustion engine having a camshaft phase adjuster, the method comprising the following steps:
   obtaining a setpoint positioning rate of the camshaft phase adjuster based on a deviation between a predefined camshaft angle adjustment setpoint value, which indicates a setpoint value of a relative displacement between a crankshaft position angle and a camshaft position angle, and a camshaft angle adjustment actual value, which indicates an actual relative displacement;
   calculating the actuator correcting variable as a function of the setpoint positioning rate;
   applying a correction variable to the actuator correcting variable to obtain a modified actuator correcting variable;
   using the modified actuator correcting variable and a nonlinear final control element model to obtain a controlling setpoint positioning rate that defines an angular velocity of a relative adjustment of the camshaft phase adjuster; and
   controlling the camshaft phase adjuster according to the controlling setpoint positioning rate;
   wherein:
      the nonlinear final control element model indicates a relationship that defines values of the controlling setpoint positioning rate as a function of values of the actuator correcting variable; and
      the calculation of the actuator correcting variable as a function of the setpoint positioning rate is performed using an inverted final control element model.

2. The method as recited in claim 1, further comprising:
   adding a dynamic pilot control variable to the setpoint positioning rate in order to obtain a modified setpoint positioning rate, wherein the actuator correcting variable is calculated by applying the modified setpoint positioning rate to the an inverted final positioning element model.

3. The method as recited in claim 1, further comprising:
   adding a predefined disturbance variable to the setpoint positioning rate to compensate for disturbances at an input of a controlled system so that a modified setpoint positioning rate is obtained by which the actuator correcting variable is calculated using the inverted final control element model.

4. The method as recited in claim 1, wherein the application of the correction variable to the actuator correcting variable is performed by multiplying or dividing the actuator correcting variable by the correction variable.

5. The method as recited in claim 1, wherein:
   the correction variable is determined by iteratively performing the following:
      (1) determining a modeled positioning rate from the setpoint positioning rate using a predefined model parameter that corresponds to a value of the correction variable;
      (2) ascertaining a difference between an instantaneous actual positioning rate and the modeled positioning rate; and
      (3) changing the value of the correction variable to thereby effect contribute to a minimization the ascertained difference between the instantaneous actual positioning rate and the modeled positioning rate; and the iterations are performed until the minimization is completed resulting in a final value of the correction variable, which is applied to the actuator correcting variable.

6. The method as recited in claim 1, wherein the correction variable is determined by:
(1) determining a modeled positioning rate from the setpoint positioning rate using a predefined model parameter that corresponds to a value of the correction variable;
(2) ascertaining a difference between an instantaneous actual positioning rate and the modeled positioning rate; and
(3) minimizing the ascertained difference between the instantaneous actual positioning rate and the modeled positioning rate.

7. A device for operating an internal combustion engine using a camshaft phase adjuster, the device configured to:
obtain a setpoint positioning rate of the camshaft phase adjuster based on a deviation between a predefined camshaft angle adjustment setpoint value, which indicates a setpoint value of a relative displacement between a crankshaft position angle and a camshaft position angle, and a camshaft angle adjustment actual value, which indicates an actual relative displacement;
calculate an actuator correcting variable as a function of the setpoint positioning rate;
apply a correction variable to the actuator correcting variable to obtain a modified actuator correcting variable;
use the modified actuator correcting variable and a nonlinear final control element model to obtain a controlling setpoint positioning rate that defines an angular velocity of a relative adjustment of the camshaft phase adjuster; and
control the camshaft phase adjuster according to the controlling setpoint positioning rate;
wherein:
the nonlinear final control element model indicates a relationship that defines values of the controlling setpoint positioning rate as a function of values of the actuator correcting variable; and
the calculation of the actuator correcting variable as a function of the setpoint positioning rate is performed using an inverted final control element model.

8. The device as recited in claim 7, wherein:
the correction variable is determined by iteratively performing the following:
(1) determining a modeled positioning rate from the setpoint positioning rate using a predefined model parameter that corresponds to a value of the correction variable;
(2) ascertaining a difference between an instantaneous actual positioning rate and the modeled positioning rate; and
(3) changing the value of the correction variable to thereby effect contribute to a minimization the ascertained difference between the instantaneous actual positioning rate and the modeled positioning rate; and
the iterations are performed until the minimization is completed resulting in a final value of the correction variable, which is applied to the actuator correcting variable.

9. The device as recited in claim 7, wherein the correction variable is determined by:
(1) determining a modeled positioning rate from the setpoint positioning rate using a predefined model parameter that corresponds to a value of the correction variable;
(2) ascertaining a difference between an instantaneous actual positioning rate and the modeled positioning rate; and
(3) minimizing the ascertained difference between the instantaneous actual positioning rate and the modeled positioning rate.

10. An engine system comprising:
a reciprocating-piston internal combustion engine having a crankshaft, at least one camshaft that is driven by the crankshaft and that operates an intake valve and/or an exhaust valve of a cylinder of the internal combustion engine, the at least one camshaft being coupled with a camshaft phase adjuster for a relative adjustment between the at least one crankshaft and the camshaft; and
a device for operating an internal combustion engine using the camshaft phase adjuster, the device configured to:
obtain a setpoint positioning rate of the camshaft phase adjuster based on a deviation between a predefined camshaft angle adjustment setpoint value, which indicates a setpoint value of a relative displacement between a crankshaft position angle and a camshaft position angle, and a camshaft angle adjustment actual value, which indicates an actual relative displacement;
calculate an actuator correcting variable as a function of the setpoint positioning rate;
apply a correction variable to the actuator correcting variable to obtain a modified actuator correcting variable;
use the modified actuator correcting variable and a nonlinear final control element model to obtain a controlling setpoint positioning rate that defines an angular velocity of a relative adjustment of the camshaft phase adjuster; and
control the camshaft phase adjuster according to the controlling setpoint positioning rate;
wherein:
the nonlinear final control element model indicates a relationship that defines values of the controlling setpoint positioning rate as a function of values of the actuator correcting variable; and
the calculation of the actuator correcting variable as a function of the setpoint positioning rate is performed using an inverted final control element model.

11. The engine system as recited in claim 10, wherein:
the correction variable is determined by iteratively performing the following:
(1) determining a modeled positioning rate from the setpoint positioning rate using a predefined model parameter that corresponds to a value of the correction variable;
(2) ascertaining a difference between an instantaneous actual positioning rate and the modeled positioning rate; and
(3) changing the value of the correction variable to thereby effect contribute to a minimization the ascertained difference between the instantaneous actual positioning rate and the modeled positioning rate; and the iterations are performed until the minimization is completed resulting in a final value of the correction variable, which is applied to the actuator correcting variable.

12. The engine system as recited in claim 10, wherein the correction variable is determined by:
(1) determining a modeled positioning rate from the setpoint positioning rate using a predefined model parameter that corresponds to a value of the correction variable;
(2) ascertaining a difference between an instantaneous actual positioning rate and the modeled positioning rate; and
(3) minimizing the ascertained difference between the instantaneous actual positioning rate and the modeled positioning rate.

13. A non-transitory machine-readable memory medium on which is stored a computer program that is executable by a computer for operating an internal combustion engine having a camshaft phase adjuster, the computer program, when executed by the computer, causing the computer to perform the following steps:
obtaining a setpoint positioning rate of the camshaft phase adjuster based on a deviation between a predefined camshaft angle adjustment setpoint value, which indicates a setpoint value of a relative displacement between a crankshaft position angle and a camshaft position angle, and a camshaft angle adjustment actual value, which indicates an actual relative displacement;
calculating the actuator correcting variable as a function of the setpoint positioning rate;
applying a correction variable to the actuator correcting variable to obtain a modified actuator correcting variable;
using the modified actuator correcting variable and a nonlinear final control element model to obtain a controlling setpoint positioning rate that defines an angular velocity of a relative adjustment of the camshaft phase adjuster; and
controlling the camshaft phase adjuster according to the controlling setpoint positioning rate;
wherein:
the nonlinear final control element model indicates a relationship that defines values of the controlling setpoint positioning rate as a function of values of the actuator correcting variable; and
the calculation of the actuator correcting variable as a function of the setpoint positioning rate is performed using an inverted final control element model.

14. The non-transitory machine-readable memory medium as recited in claim 13, wherein:
the correction variable is determined by iteratively performing the following:
(1) determining a modeled positioning rate from the setpoint positioning rate using a predefined model parameter that corresponds to a value of the correction variable;
(2) ascertaining a difference between an instantaneous actual positioning rate and the modeled positioning rate; and
(3) changing the value of the correction variable to thereby effect contribute to a minimization the ascertained difference between the instantaneous actual positioning rate and the modeled positioning rate; and
the iterations are performed until the minimization is completed resulting in a final value of the correction variable, which is applied to the actuator correcting variable.

15. The non-transitory machine-readable memory medium as recited in claim 13, wherein the correction variable is determined by:
(1) determining a modeled positioning rate from the setpoint positioning rate using a predefined model parameter that corresponds to a value of the correction variable;
(2) ascertaining a difference between an instantaneous actual positioning rate and the modeled positioning rate; and
(3) minimizing the ascertained difference between the instantaneous actual positioning rate and the modeled positioning rate.

* * * * *